United States Patent [19]

Lesgourgues et al.

[11] Patent Number: 4,507,051
[45] Date of Patent: Mar. 26, 1985

[54] GAS TURBINE BLADE WITH CHAMBER FOR CIRCULATION OF COOLING FLUID AND PROCESS FOR ITS MANUFACTURE

[75] Inventors: Jacques Lesgourgues, Corbeil; Jacques P. H. Tirole, Chilly Mazarin, both of France

[73] Assignee: S.N.E.C.M.A., Paris, France

[21] Appl. No.: 440,743

[22] Filed: Nov. 10, 1982

[30] Foreign Application Priority Data

Nov. 10, 1981 [FR] France ............... 81 20995

[51] Int. Cl.³ .............................. F01D 5/08
[52] U.S. Cl. ..................... 416/97 R; 416/213 R; 416/229 A; 416/233
[58] Field of Search ............... 416/95–97 A, 416/213 R, 229 A, 229 R, 233, 90; 415/115

[56] References Cited

U.S. PATENT DOCUMENTS

| | | |
|---|---|---|
| 3,017,159 | 1/1962 | Foster et al. |
| 3,515,499 | 6/1970 | Beer et al. ............. 416/95 |
| 3,528,751 | 9/1970 | Quinones et al. |
| 3,628,885 | 12/1971 | Sidenstick et al. ............. 416/95 |
| 3,801,218 | 8/1972 | Moore ............. 416/95 |
| 3,891,348 | 6/1975 | Auxier ............. 416/96 A |
| 3,965,963 | 6/1976 | Phipps. |
| 4,056,332 | 11/1977 | Meloni ............. 416/96 A |
| 4,257,737 | 3/1981 | Andress. |

FOREIGN PATENT DOCUMENTS

| | | | |
|---|---|---|---|
| 1276994 | 12/1960 | France. | |
| 1078116 | 8/1967 | United Kingdom | ............. 416/96 A |
| 1188401 | 4/1970 | United Kingdom | ............. 416/95 |

Primary Examiner—Samuel Scott
Assistant Examiner—B. J. Bowman
Attorney, Agent, or Firm—Oblon, Fisher, Spivak, McClelland & Maier

[57] ABSTRACT

A gas turbine blade in which are provided inter alia two chambers for the circulation of cooling fluid, lying in proximity to the leading and trailing edges of the blade respectively, two conduits disposed respectively between the first chamber and the leading edge and between the second chamber and the trailing edge, and apertures connecting each conduit to the chamber nearest to it. The blade is produced by diffusion-brazing two half-blades together. The chambers are formed in part in one, and in part in the other, half blade. In order to produce the conduits and apertures by means of grooves engraved in the facing surface of the two half blades, the interface of the two half-blades divides said conduits and apertures in two.

3 Claims, 5 Drawing Figures

GAS TURBINE BLADE WITH CHAMBER FOR CIRCULATION OF COOLING FLUID AND PROCESS FOR ITS MANUFACTURE

BACKGROUND OF THE INVENTION

1. Field of the Invention

The present invention relates generally to gas turbine blades having at least one chamber for circulation of a cooling fluid, which may be air obtained by deviation of a fraction of the flow delivered by a compressor associated with the turbine. The term "turbine blades" here includes the stationary vanes of a turbine nozzle as well as the moving blades of a rotor. More specifically, the invention involves a manufacturing process for such blades, blade sections (half-blades) used for practicing said process and the blades obtained through the process. It should be noted that the term "half blade" is not intended in the mathematical sense of the word "half", but rather designates two different elements, one including the concave face of the blade and the other its convex face.

2. Description of the Prior Art

French Pat. No. 1,276,994 describes a gas turbine blade in which are provided a cooling fluid circulation chamber running the length of the blade in proximity to its leading edge, a first rectilinear conduit situated between said chamber and the leading edge and parallel to the latter, and a connecting groove between the conduit and the chamber. The blade may further include a cooling fluid circulation chamber running the length of the blade in proximity to its trailing edge, a second rectilinear conduit situated between the chamber and the trailing edge, parallel to the latter and issuing into ports in the trailing edge, and a connecting groove between the conduit and the chamber.

In order to facilitate construction of the chambers, the blade is produced by brazing two complementarily shaped half-blades, one of which includes the convex face of the blade and the other its concave face. The sectional area of the chambers is divided between the two half-blades, which are brazed together at points close to the leading and trailing edges. However, it will be noted that the interface of the two half-blades contains irregularities such that the first rectilinear conduit and the corresponding groove lie entirely within the half-blade comprising convex face. The same is true for the area of the ports in the trailing edge.

The reasons for this arrangement of the interface are not given in the patent. However, they probably involve a precaution intended to ensure a precise fit between the two half-blades, with the irregularities of the interface acting as stops in order to avoid total or partial blocking of the ports and conduits by brazing.

However, this interface arrangement complicates inter alia the production of the facing surfaces of the half-blades, the machining of the first conduit (which must be drilled through along the entire length of the blade), and the machining of the ports in the trailing edge (which must be drilled from this edge).

SUMMARY OF THE INVENTION

One of the objects of the present invention is to provide a process for producing a turbine blade of the above-mentioned type, in which are provided a cooling fluid circulation chamber running the length of the blade near its leading edge, a rectilinear conduit near and parallel to the leading edge, and at least one connecting aperture between the chamber and the conduit.

In known fashion, this process consists of joining two complementarily shaped half-blades, one of which includes the convex face of the blade and the other its concave face. The sectional area of said chamber is divided between the two half-blades.

For purposes of producing said conduit and apertures by engraving grooves in the facing surface of at least one of the half-blades prior to assembly, the interface of the two half-blades is shaped in such a way that it passes through the cross-sections of said conduit and aperture in the vicinity of the forward generatrix in the leading edge.

This arrangement of the process of the invention may permit, provided some precautions are taken, as described below, joining two half-blades by brazing, without distorting them or blocking the grooves engraved in one or the other of the surfaces to be brazed.

If the blade to be brazed is also to include a cooling fluid circulation chamber running the length of the blade in proximity to its trailing edge, a second rectilinear conduit situated between said chamber and the trailing edge and parallel to the latter, and at least one connecting aperture between said second conduit and said chamber, then the interface of the two half-blades is shaped such that it passes through the cross-sections of said second conduit and said aperture in the vicinity of the downstream generatrix in the trailing edge and possibly through the cross-sections of the ports which open into the trailing edge.

The advantages of the process of the invention over the process of the above-mentioned French patent are as follows:

1. Production of the conduits, apertures, and ports is greatly facilitated;
2. The need for providing irregularities in the interface disappears;
3. It becomes possible to increase the number of apertures connecting the chambers and conduits and to arrange their distribution so as to ensure maximum cooling effectiveness in the leading and trailing edges; and
4. If, according to a known arrangement, rectilinear channels extend from the first conduit into the forward area of the convex face in order to cool this area by lapping and dilution, it becomes possible to machine these channels by drilling them from said first conduit. This greatly facilitates their production and makes it possible to orient them so that their direction will be as close as possible to that of the flow of gases in the vicinity of said forward area. The efficiency of the channels is thus notably increased.

A second object of the invention is a half-blade (and a pair of complementarily shaped half-blades) the facing surface of which is shaped in such a way that the interface has the characteristics defined above.

A third object of the invention is a gas turbine blade formed by brazing two complementarily shaped half-blades the interface of which has said characteristics.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
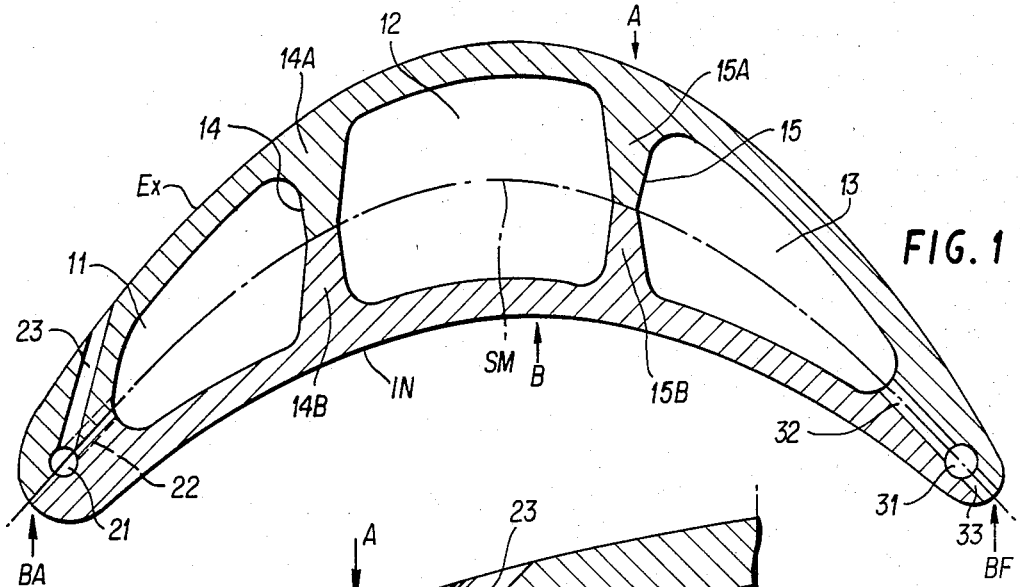
FIG. 1 is an enlarged cross-section of a gas turbine blade produced in accordance with the teachings of the invention by joining two half-blades A and B.
Figure 2:
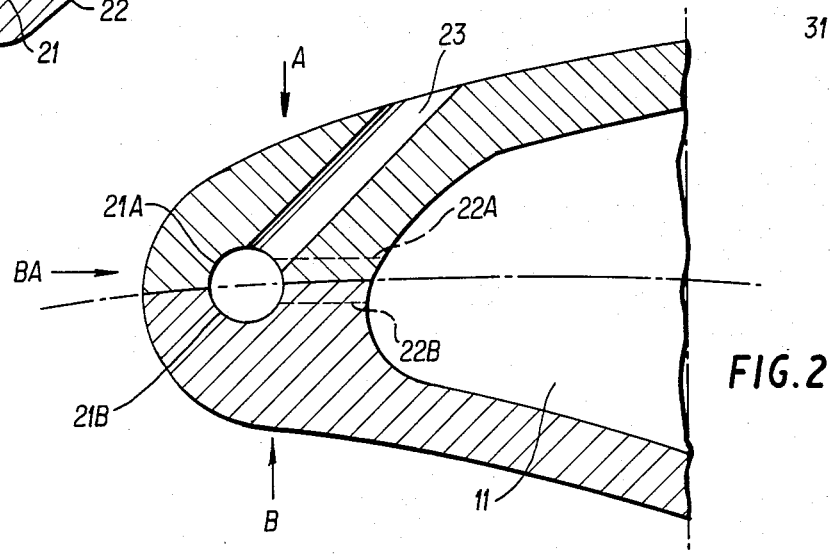
FIG. 2 is a larger-scale partial section of the upstream area of said blade.
Figure 3:
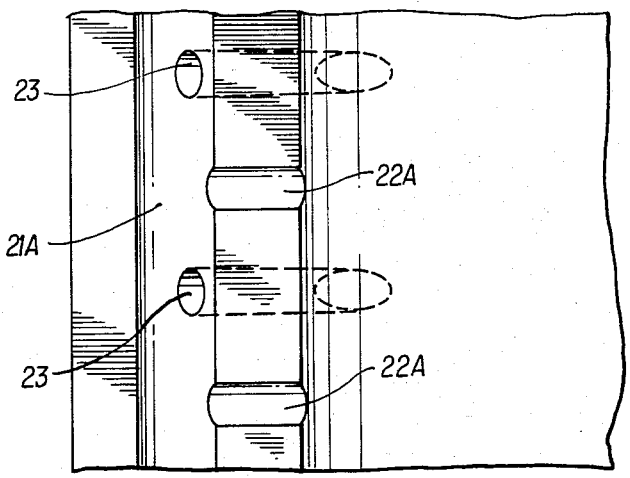
FIG. 3 is a view of the same area and at the same scale, showing the facing surface of half-blade A.

FIGS. 1, 2, and 3 will be described simultaneously. Made of a nickel or cobalt based superalloy, the blade is provided with three air circulation chambers: forward chamber 11 closest to leading edge BA, downstream chamber 13 closest to trailing edge BF, and middle chamber 12. Ribs 14 and 15 separate chamber 11 from chamber 12 and chamber 12 from chamber 13 respectively.

A conduit 21 runs through the blade portion defined by leading edge BA and by chamber 11. Said conduit 21 communicates with chamber 11 through a number of apertures 22, cooling said leading edge by the effect of a fraction of the flow of air issuing from chamber 11. A number of rectilinear channels 23 originate in conduit 21 and open along a generatrix in the upstream area of the convex face EX which is cooled by air from the channels 23 lapping against the surface of the face.

Another conduit 31 runs through the blade section defined by trailing edge BF and chamber 13. Said conduit 31 communicates with chamber 13 through a number of apertures 32. A number of ports 33 originate in conduit 31 and issue into the downstream generatrix of said trailing edge. Ports 33 are preferentially axially offset along the trailing edge generatrix with respect to apertures 32, e.g., so as to open into conduit 31 axially midway between two apertures 32. For reasons of simplicity in the drawing, apertures 32 and ports 33 have both been brought into the same cross-sectional plane. In a preferred embodiment, conduits 21 and 31 are rectilinear.

It will be noted that the end sections of the blade (the top and root at the bottom) have not been shown. This omission is intentional, since the invention applies equally to cases where the vane is a stationary blade forming part of a directional blading system or a moving blade forming part of a rotor.

The blade shown consists of an assembly of two cast half-blades A and B, the first of which includes the convex face EX and the second concave face IN of the blade. According to the invention, their interface SM includes the facing solid surfaces lying closest to the upstream generatrix in leading edge BA and the downstream generatrix in trailing edge BF. Interface SM essentially cuts rib 14 into two halves 14A and 14B and rib 15 likewise into 15A and 15B. The rib halves are tapered to facilitate the casting of the two half blades. In the embodiment shown, conduits 21 and 31, apertures 22 and 32, and ports 33 have a cylindrical cross-section lying half in half-blade A and half in half-blade B (e.g., 21A and 21B, 22A and 22B), enabling them to be produced prior to assembly by (for example) engraving semi-circular grooves in the facing surfaces. Channels 23 also have a circular cross-section and can be easily produced by drilling through the bottom of the half-blade A from conduit 21A.

Construction of the blade thus comprises the following main steps:

1. Casting half-blades A and B;
2. Preparation of surfaces lying on interface SM;
3. Engraving conduits, apertures, and ports 21, 22, 31, 32, and 33;
4. Drilling channels 23 through the bottom of half-blade A from conduit 21A and coating the engravings with a layer of an anti-wetting material;
5. Joining and brazing the areas of contact between the half-blades in the vicinity of the leading and trailing edges; and
6. Thermal diffusion treatment.

Figure 4:
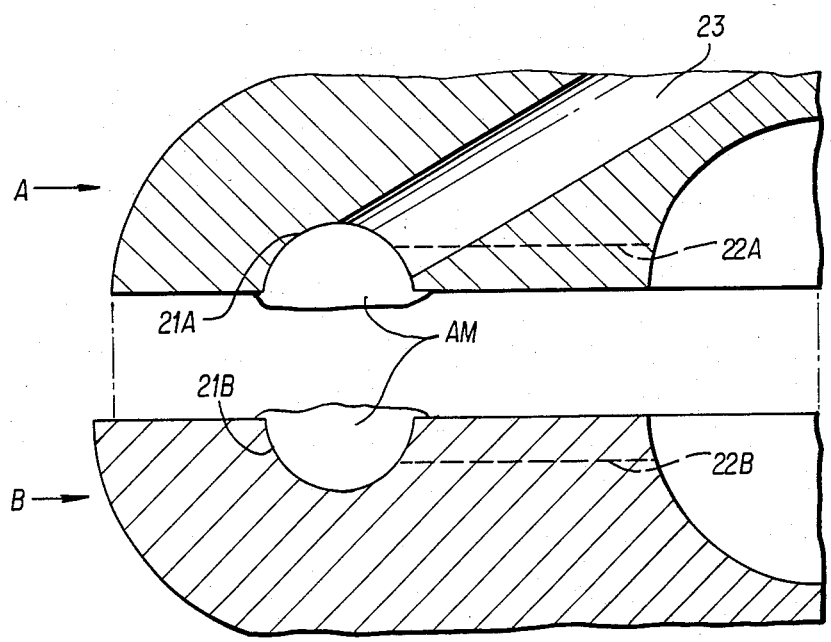
FIG. 4 shows partial cross-sections, in larger scale than FIG. 2, of two half-blades used to produce the blade, seen immediately before joining and brazing.
Figure 5:
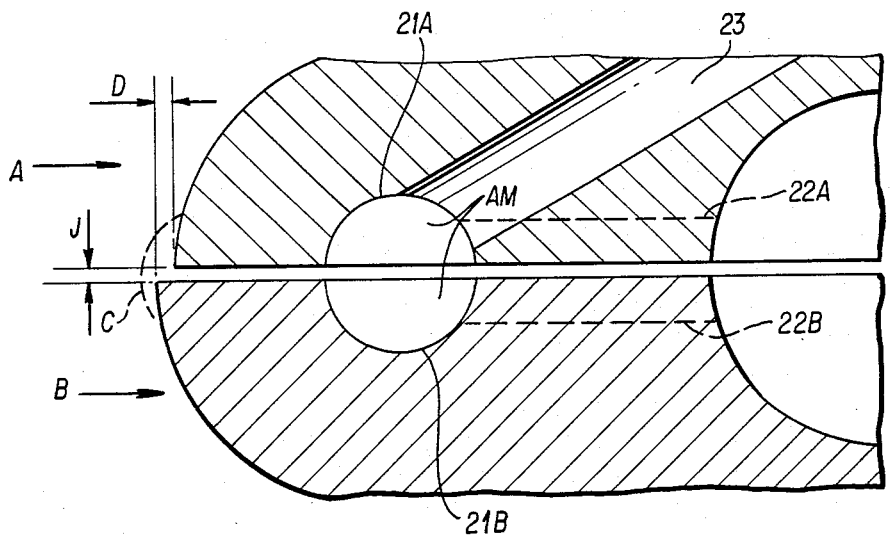
FIG. 5 shows the same sections at the same scale, immediately after brazing.

With reference to FIGS. 4 and 5, some additional detail will be provided concerning certain of these operations.

If the engraved conduits and apertures, e.g., 21A, 21B, 22A, 22B, are to have a small sectional area (less than several square millimeters), it is preferable for surface preparation to include a grinding of the portions of the surface to be brazed. FIGS. 4 and 5 illustrate a case in which the conduits and apertures are circular, which means that they are to lie half in half-blade A and half in half-blade B. However, if the shapes of these sections allow it, they may obviously be provided within a single half-blade. In any case, any suitable engraving method may be used (milling, electro-chemical machining, electro-erosion, etc.). Channels 23 may be fashioned using any appropriate drilling method chosen as a function of the diameter and depth of the channels.

The "anti-wetting" material AM deposited in the engraving consists of a refractory oxide powder, e.g., alumina, projected by a gun within a suspension of a volatile, non-contaminating liquid, e.g., ethyl alcohol. The surfaces to be brazed are then cleaned.

The layer of filler metal to be used in brazing may be put in place in a variety of forms, including electrolytic flash over at least one of the half-blades if the surfaces to be brazed form a near perfect joint (i.e., if tolerance J is very small); commercial strip if tolerance J is regular and less than about 10 microns over the entire surface; or if the tolerance is irregular, ribbon or paste obtained by dispersing the alloy brazing powder in a pyrolyzable resin which will leave no carbon residue.

The ribbon or paste may also be placed so as to form a belt C surrounding the joint and flowing between the half-blades during the heat treatment.

If the engraved conduits and apertures are very minute (cross-sectional area of less than one $mm^2$), the anti-moisture deposit may not be adequate to avoid some partial obstruction of the openings. It then becomes important for the quantity of filler metal to be strictly limited. The most efficient solution consists of using, in known fashion, filler metal in the form of guaged wire, the length of the cuts of which are determined in advance by tests.

With regard to the composition of the filler metal, tests using half-blades made of superalloys with a base of nickel (NK15CATu) or cobalt (KC25NWTa and KC25NW) have shown that the best results are obtained with the following alloy (on the condition that tolerance J does not exceed 100 microns) in proportion (%) by weight:

3.5 B; 15 CR; remainder Ni

This is a eutectic substance with a melting point of 1055° C. The heat treatment parameters are as follows (in vacuum oven):

1. Brazing: 15 min. at 1200° C.
2. Diffusion: 16 hours at 1160° C.

When tolerance J is large and irregular, the following brazing compound may be used:

3 B; 4.5 Si; 20 Co; remainder Ni but porousness may subsist in the brazed joint, probably due to the fact that this compound is not eutectic and the quantity of metal melted in the brazing operation is relatively large. It is then preferable to use the brazing process described in the French patent application registered on Aug. 26, 1981 under No. 81.16283. The process of said French patent application consists of using as filler material a homogeneous mixture of two alloy powders in essentially unequal proportions by weight, i.e.:

1. In the larger proportion, a superalloy powder called the "powder base", the composition of which resembles that of the parts to be joined and contains little or no filler (or melting) material;
2. In the smaller proportion, an alloy powder called the "filler powder" which contains, besides nickel and/or cobalt, a filler element in a quantity such that the liquidus temperature of this filler powder is less than the solidus temperature of the superalloy parts to be joined (here, the half-blades) and of the powder base.

The reasons why this process gives good results, even where tolerance J is large, will not be given here since they appear in detail in the said French patent application. To join two cobalt-based superalloy half-blades KC24NWTa, best results are obtained with the following composition of finishing material:

1. 95% (by weight) powder base of KC25NW superalloy, and
2. 5% filler powder composed of 17 Co, 4 Si, 2.7 B, with the remainder of Ni (by weight).

The process parameters are then as follows:

1. Brazing: 15 min. at 1200° C.
2. Diffusion: 15 hours at 1200° C.

Whatever the brazing process used, it may be useful to replenish the circumference of the brazed joint, either to fill small recesses or to eliminate any overlap of the edges of the two half-blades, e.g., as shown at D in FIG. 5. This replenishing is carried out following the thermal brazing process and before the thermal diffusion process, using a belt of paste containing a filler metal powder in suspension in a pyrolyzable resin. The metal belt melts and flows during the thermal diffusion process, filling holes and/or hiding any overlap between half-blades.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hollow metal gas turbine blade having a leading edge, a trailing edge, a concave face and a convex face extending in a longitudinal direction, said blade being composed of a second half blade and a first half blade, and second half blade defined by a portion of said leading edge, a portion of said trailing edge, said convex face and a plane extending between said leading and trailing edges, said first half blade comprising:

a first longitudinal depression in a first surface of said first half blade defined by said plane, said first depression being located adjacent said leading edge;

a first longitudinal groove in said first surface and located between said leading edge and said first depression, said first longitudinal groove extending along said first half blade through the length of said leading edge and said first longitudinal depression;

an array of second groove in said first surface, each of said second groove extending transverse to said first groove and parallel to said plane, each of said second groove connecting said first depression and said first groove;

an array of first bores only in said first half blade, each of said first bores extending at an angle with respect to said plane and connecting said first groove with a forward portion of said convex face;

a second longitudinal depression in said first surface of said first half blade, said second depression being located adjacent said trailing edge;

a third longitudinal groove in said first surface and located between said trailing edge and said second depression;

an array of fourth grooves in said first surface, each of said fourth grooves extending transverse to said third groove and parallel to said plane, each of said fourth grooves connecting said third groove to said second depression; and an array of fifth grooves in said first surface, each of said fifth grooves extending parallel to each of said fourth grooves, each of said fifth grooves connecting said third groove to said trailing edge.

2. The blade of claim 1 wherein said grooves of said arrays of fourth and fifth grooves are mutually longitudinally staggered.

3. A hollow metal gas turbine blade having a leading edge, a trailing edge, a concave face and a convex face extending in a longitudinal direction, said blade being composed of a second half blade and a first half blade, said second half blade defined by a portion of said leading edge, a portion of said trailing edge, said convex face and a plane extending between said leading and trailing edges, said first half blade comprising:

a first longitudinal depression in a first surface of said first half blade defined by said plane, said first depression being located adjacent said leading edge;

a first longitudinal groove in said first surface and located between said leading edge and said first depression, said first longitudinal groove extending along said first half blade through the length of said leading edge and said first longitudinal depression;

an array of second grooves in said first surface, each of said second grooves extending tranverse to said first groove and parallel to said plane, each of said second grooves connecting said first depression and said first groove;

an array of first bores only in said first half blade, each of said bores extending at an angle with respect to said plane and connecting said first groove with a forward portion of said convex face;

a second longitudinal depression in said first surface of said first half blade, said second depression being located adjacent said trailing edge;

a third longitudinal groove in said first surface and located between said trailing edge and said second depression;

an array of fourth grooves in said first surface, each of said fourth grooves extending transverse to said third groove and parallel to said plane, each of said fourth grooves connecting said third groove to said second depression; and an array of fifth grooves in said first surface, each of said fifth grooves extending parallel to each of said fourth grooves, each of said fifth grooves connecting said third grooves to said trailing edge, wherein said second half blade includes a portion of said leading edge, a portion of said trailing edge, said concave face and said plane, said second half blade including a first surface, a first depression, a first groove and an array of second grooves at positions respectively corresponding to said first depression, said first groove and said array of second grooves of said first half blade, said first surfaces of said first half blade and second half blade being joined by diffusion brazing, whereby said two first depressions define a first fluid circulation chamber communicating with a fluid source, said two first grooves define a first conduit, said two arrays of second grooves defining an array of second conduits, said two third grooves define a third conduit, and said two arrays of fourth and fifth grooves respectively define fourth and fifth conduits.

* * * * *